Nov. 3, 1942.   H. E. B. HOLBEN   2,300,423
TAPE DISPENSER
Filed Sept. 16, 1941   2 Sheets-Sheet 1

INVENTOR
Harold E. B. Holben
BY
George H. Lorch
ATTORNEY

Nov. 3, 1942.  H. E. B. HOLBEN  2,300,423
TAPE DISPENSER
Filed Sept. 16, 1941    2 Sheets-Sheet 2
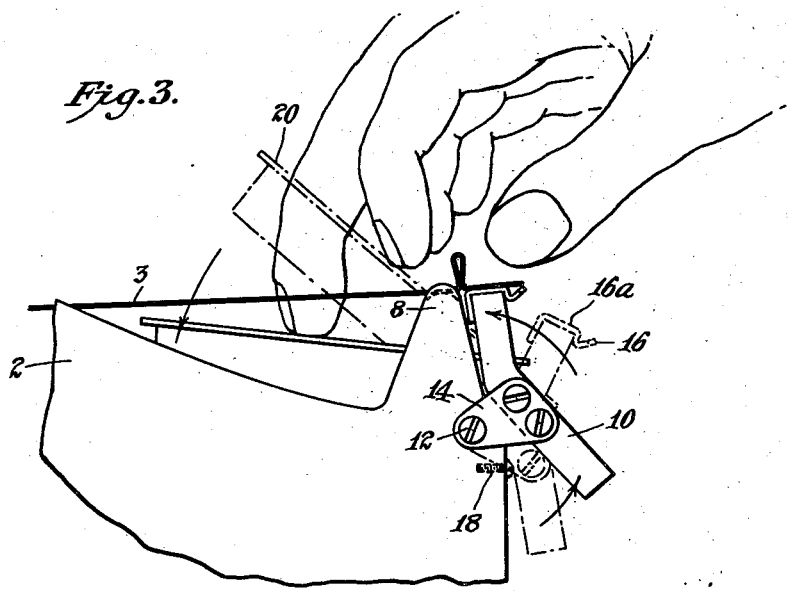
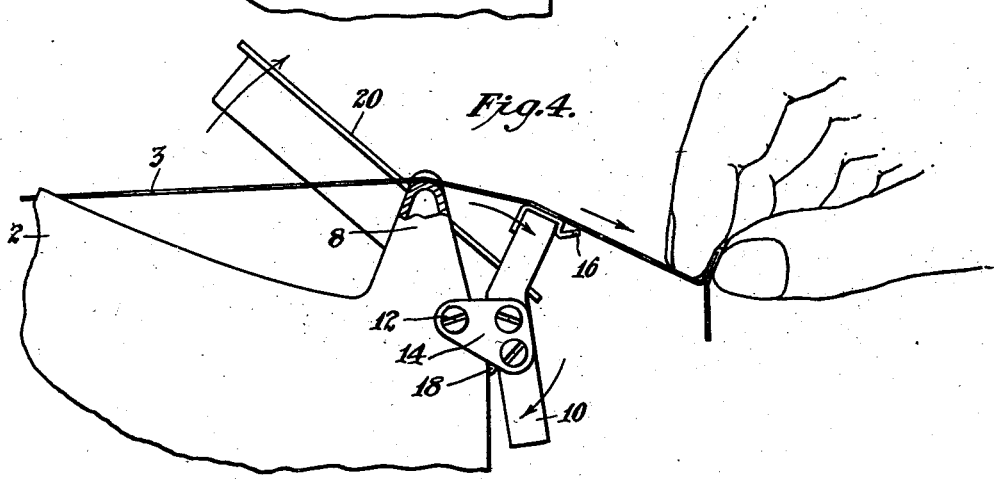
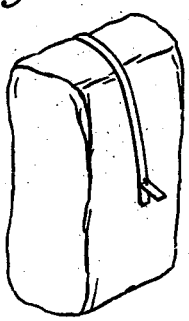
INVENTOR
Harold E. B. Holben
BY
George H. Lorch
ATTORNEY Patented Nov. 3, 1942

2,300,423

UNITED STATES PATENT OFFICE 2,300,423

TAPE DISPENSER

Harold E. B. Holben, Allentown, Pa., assignor to The Industrial Tape Corporation, North Brunswick, N. J., a corporation of New Jersey Application September 16, 1941, Serial No. 411,037

11 Claims. (Cl. 270—68)

This invention relates to means for forming tabs upon strips of adhesive tape. It is the present trend to use adhesive tapes and more particularly pressure-sensitive adhesive tapes for wrapping and sealing packages, index tabs, and many other uses where it is desired to have a pull or index tab portion terminating in a pair of adhesive portions, the tab portion serving to facilitate removal of the tape or turning of pages where the tab is used as an index tab.

Because of the very nature of pressure-sensitive adhesive tape, it is particularly desirable to have a tab to facilitate removal, yet it is not possible to prefabricate these tabs as can be done in the case of other types of adhesives tapes. By necessity, therefore, when pressure-sensitive adhesive tape is employed and tabs are desired, it has been the custom to make these tabs by hand at the place where the tape was used. Hand manufacture of tabs on pressure-sensitive adhesive tape is a tedious, inaccurate, and messy task resulting in non-uniform, imperfect, and altogether unsatisfactory tabs.

It is the purpose of this invention to provide a device which will facilitate the making of pull or index tabs on a strip of pressure-sensitive adhesive tape.

It is a further object of this invention to provide such a device that is in the nature of an attachment that is substantially automatic in operation and may be applied to existing pressure-sensitive adhesive tape dispensing devices without any material change or alteration of the existing devices, and one which will not interfere with normal use of the tape dispensing device when it is not desired to provide tabs.

Other objects and advantages will be apparent from the following description given in connection with the drawings in which:

Figure 3 is a fragmentary side elevation of the tab making attachment illustrating the initial step in detaching a formed tab;

Figure 4 is a similar view illustrating the final steps in withdrawing the formed tab; and Figure 5 is a perspective view of a package illustrating one use of a pull tab on a sealing strip of pressure-sensitive adhesive tape.

Figure 1:
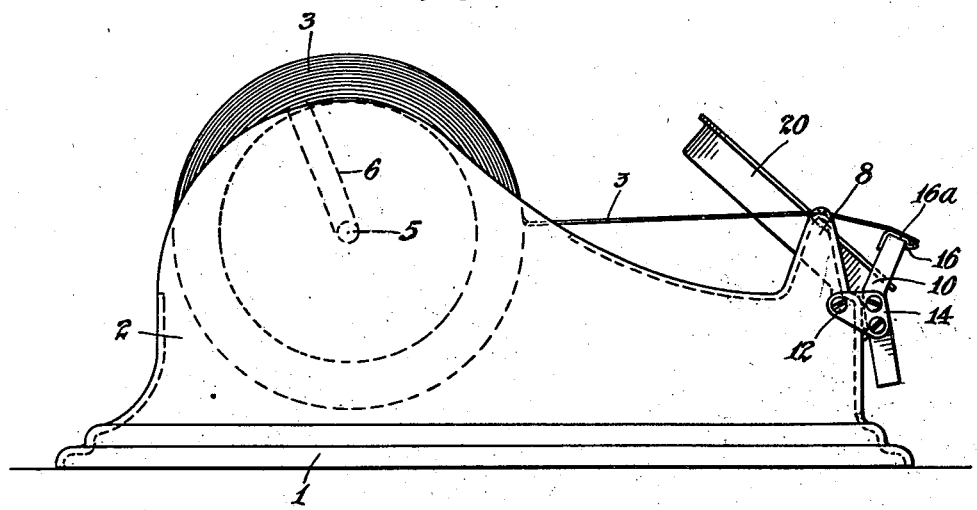
Figure 1 is a side elevation of a pressure-sensitive adhesive tape dispenser having a tab making attachment applied thereto.

Referring now more particularly to the drawings, there is illustrated (Figs. 1 and 2) a pressure-sensitive adhesive tape dispenser known to the trade as a "Texcel" dispenser, having a tab forming device applied thereto. The dispenser comprises generally a relatively heavy base 1 from which two spaced side walls 2 extend, and between which is mounted a roll 3 of pressure-sensitive adhesive tape, carried by a roller 4 having trunnions 5 journaled in inclined slots 6 formed in the inner face of the walls 2.

Somewhat spaced from the roller 4, the dispenser is provided with a pedestal or platform 8 to which the tape lightly adheres and to which the tab applying device is attached. Ordinarily the pedestal also carries a cutting device. When a tab device is attached, the cutter is removed from this point. The construction so far described is typical of the "Texcel" dispenser, and is shown for illustrative purposes only, inasmuch as the tab applying mechanism now to be described may be applied to any other type of dispenser having means for supporting a roll of tape and a platform to which the tape will adhere.

The tab applying device is attached to the forward end or pedestal of the dispenser and comprises a second platform formed upon the upper end of an angular member 10, pivoted at 12, to the lower front portion of the pedestal 8 by means of a pair of plates 14, rigidly secured to the member 10 and pivotally attached to the pedestal at 12. The upper end of the platform may conveniently carry the toothed cutting blade 16, the rear portion 16a of which overlies the upper end of the platform and provides a contact surface to which the adhesive tape will lightly adhere. The cutting blade is similar to that found on the usual dispensers and in fact may be the one removed from the dispenser if an ordinary dispenser is being converted into one for forming tabs. The pivotal point and length of the member 10 are so arranged that when the member 14 is rotated counterclockwise the contact surface 16a will lie adjacent the contact surface of platform 8. The member 14 is of such proportions that normally it will be urged by gravity to its clock-wise position (Figs. 1 and 4), to provide a space between the contact surface of the platform 8 and contact surface 16a of the platform on the member 10. The clock-wise position of the member 10 and the space between the two contact areas may be adjusted or varied by means of the adjustable stop screw 18 (Figs. 3 and 4).

For ease in operation, the member 10 is provided with a rearwardly projecting arm 20 to facilitate counterclock-wise rotation of the arm 10 when it is desired to form a loop or tab in the tape being dispensed. The arm 20 is of such proportion and in such position as to be easily engaged by the fingers of the operator.

Operation of the tab applying device is very simple and believed to be readily understood from the foregoing description and drawings, and will be merely briefly described.

As is customary in this type of dispenser, the adhesive tape is withdrawn from the roll with the adhesive side down and carried forward where it is brought into contact with the pedestal or platform 8. In the present instance the tape is carried beyond this point and then lowered so as to be brought into contact with platform 8 and also contact surface 16a of the second platform or member 10 with the latter in its clock-wise position. If it is desired to dispense a section of tape without forming a tab therein, the tape is further lowered and drawn across the edge of the knife 16.

Figure 2:
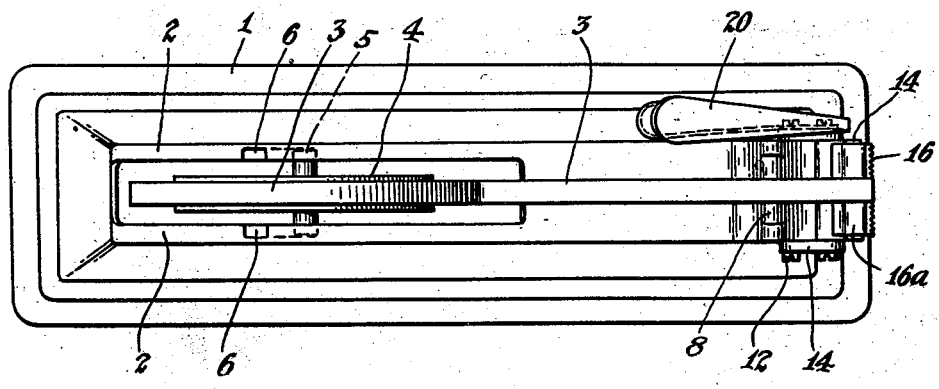
Figure 2 is a plan view of the same device.

Assuming that the tape is in the position of Fig. 1, that is, a previous piece has been dispensed either with or without a loop or tab, and it is desired to provide a tab; the operator merely depresses the arm 20 with the third finger, which act rotates arm 10 counterclock-wise moving the contact area 16a in close proximity to the platform 8; thus automatically folding the tape upon itself and forming a loop or tab in the tape as is illustrated in Fig. 3. Without removing the hand, the operator may then grasp the formed loop between the thumb and forefinger, pick the loop and tape upwardly, and carry it forward until the desired length of tape has been withdrawn. He then lowers the tape bringing it into contact with platform 8 and also surface 16a, which has immediately moved to the clockwise position when the tape was removed, and then downwardly across the knife 16 to tear off the section of tape having a formed tab intermediate or terminating into adhesive ends.

It will be obvious that by using a single setting of the stop screw, uniform and accurately made tabs may be formed at will by the device heretofore described. Furthermore, the mechanism embodied is extremely simple and requires very little change in the present dispensers, in fact, it is only necessary to provide three tapped holes in the dispensers now in use for receiving the pivot screws 12 and the adjusting screw 18 for any operator to attach the tab applying device to his present dispenser. The cutter 16, which is now normally found on the pedestal of platform 8, can be removed and applied to the upper or platform end of the member 10.

One particular application, by way of example only, is illustrated in Fig. 5 wherein a package is illustrated as being sealed by a relatively long strip of adhesive tape having a tab formed adjacent one end to facilitate removal of the tape. Other uses will be apparent to those skilled in the art to whom it will also be apparent that changes may be made in the details of construction without departing from the spirit and scope of the invention.

I claim:

1. A device for folding pressure-sensitive adhesive tape upon itself to form tabs comprising, means for supporting a roll of pressure-sensitive adhesive tape, and a pair of platforms to which said tape will adhere, said platforms being movable relatively to each other from spaced positions to adjacent positions.

2. A device for folding pressure-sensitive adhesive tape upon itself to form tabs comprising, means for supporting a roll of pressure-sensitive adhesive tape, and a pair of platforms to which said tape will adhere, said platforms being movable relatively to each other from spaced positions to adjacent positions, and a cutter on one of said platforms.

3. A device for folding pressure-sensitive adhesive tape upon itself to form tabs comprising, means for supporting a roll of pressure-sensitive adhesive tape, a fixed platform to which the tape will adhere, and a second platform to which said tape will adhere spaced from said fixed platform and movable toward said fixed platform.

4. A device for folding pressure-sensitive adhesive tape upon itself to form tabs comprising, means for supporting a roll of pressure-sensitive adhesive tape, a fixed platform to which the tape will adhere, a second platform to which said tape will adhere spaced from said fixed platform and movable toward said fixed platform, and a cutter on said movable platform.

5. A device for folding pressure-sensitive adhesive tape upon itself to form tabs comprising, means for supporting a roll of pressure-sensitive adhesive tape, a fixed platform to which the tape will adhere, a second platform to which said tape will adhere and movable relatively to said fixed platform, said movable platform being normally urged away from said fixed platform, and means for facilitating movement of said second platform toward said fixed platform.

6. A device for folding pressure-sensitive adhesive tape upon itself to form tabs comprising, means for supporting a roll of pressure-sensitive adhesive tape, a fixed platform to which the tab will adhere, the second platform adjacent to said fixed platform and movable relatively to said fixed platform, said movable platform being normally urged away from said fixed platform, means for facilitating movement of said second platform toward said fixed platform, and a cutter on said second platform.

7. A device for folding pressure-sensitive adhesive tape upon itself to form tabs comprising, means for supporting a roll of pressure-sensitive adhesive tape, a fixed platform to which the tape will adhere, a second platform to which said tape will adhere, said platforms being movable relatively to each other, and adjustable means for controlling movement of said platforms.

8. A device for folding pressure-sensitive adhesive tape upon itself to form tabs comprising, means for supporting a roll of pressure-sensitive adhesive tape, a fixed platform to which the tape will adhere, and a second platform to which said tape will adhere pivoted to said fixed platform for movement toward and from said fixed platform.

9. A device for folding pressure-sensitive adhesive tape upon itself to form tabs comprising, means for supporting a roll of pressure-sensitive adhesive tape, a fixed platform to which the tape will adhere, a second platform to which said tape will adhere pivoted to said fixed platform for movement toward and from said fixed platform, and a cutter on said pivoted platform.

10. A tab forming device adapted to be attached to a pressure-sensitive adhesive tape dispenser comprising, a movable platform to which the tape will adhere and having means for pivotal attachment to a fixed portion of said dispenser for movement toward and from said fixed portion of said dispenser.

11. A tab forming device adapted to be attached to a pressure-sensitive adhesive tape dispenser comprising, a movable platform to which the tape will adhere and having means for pivotal attachment to a fixed portion of said dispenser for movement toward and from said fixed portion of said dispenser, and a cutting blade attached to said movable platform.

HAROLD E. B. HOLBEN.